US010959178B2

(12) United States Patent
Ali et al.

(10) Patent No.: US 10,959,178 B2
(45) Date of Patent: Mar. 23, 2021

(54) LONG TERM EVOLUTION (LTE) LIGHT CONNECTION ENHANCEMENTS FOR LONG TERM EVOLUTION (LTE)-NEW RADIO ACCESS TECHNOLOGY (NR) INTERWORKING

(71) Applicant: Nokia Technologies Oy, Espoo (FI)

(72) Inventors: Amaanat Ali, Espoo (FI); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 3 days.

(21) Appl. No.: 16/323,066

(22) PCT Filed: Aug. 2, 2017

(86) PCT No.: PCT/IB2017/054738
§ 371 (c)(1),
(2) Date: Feb. 4, 2019

(87) PCT Pub. No.: WO2018/029578
PCT Pub. Date: Feb. 15, 2018

(65) Prior Publication Data
US 2019/0208474 A1     Jul. 4, 2019

(30) Foreign Application Priority Data
Aug. 12, 2016 (IN) .............................. 201641027725

(51) Int. Cl.
*H04W 52/02*    (2009.01)
*H04W 84/20*    (2009.01)
(Continued)

(52) U.S. Cl.
CPC ... *H04W 52/0261* (2013.01); *H04W 52/0206* (2013.01); *H04W 52/0216* (2013.01);
(Continued)

(58) Field of Classification Search
CPC . H04W 52/0261; H04W 84/20; H04W 76/27; H04W 76/15; H04W 52/0206; H04W 52/0216
See application file for complete search history.

(56) References Cited

U.S. PATENT DOCUMENTS

2014/0355562 A1* 12/2014 Gao ................... H04W 72/0426
                                                             370/331
2015/0117183 A1*  4/2015 Heo ........................ H04W 4/90
                                                             370/228
(Continued)

FOREIGN PATENT DOCUMENTS

WO    2015/197904 A1    12/2015
WO    2016/071311 A1     5/2016

OTHER PUBLICATIONS

Office action received for corresponding Indian Patent Application No. 201641027725, dated Feb. 26, 2020, 6 pages.
(Continued)

*Primary Examiner* — Brenda H Pham
(74) *Attorney, Agent, or Firm* — Squire Patton Boggs (US) LLP (57) ABSTRACT

Systems, methods, apparatuses, and computer program products supporting LTE-new radio (NR) interworking are provided. One method includes detecting, by a user equipment (UE) in connected mode and having dual connectivity with a master node and secondary node established, of inactivity for the master node. Based on the detection of the inactivity of the master node, the UE enters into a power saving state. A signaling radio bearer (SRB) of the secondary node is pre-configured prior to the entering into the power saving state. At the same time as entering the power saving state, the UE signals to the secondary node that the UE is
(Continued)

entering into the power saving state and activates the signaling radio bearer (SRB) of the secondary node.

20 Claims, 3 Drawing Sheets

(51) Int. Cl.
    *H04W 76/27*     (2018.01)
    *H04W 76/15*     (2018.01)
(52) U.S. Cl.
    CPC ........... *H04W 76/15* (2018.02); *H04W 76/27* (2018.02); *H04W 84/20* (2013.01); *Y02D 30/70* (2020.08)

(56) References Cited

U.S. PATENT DOCUMENTS

| | | | |
|---|---|---|---|
| 2015/0365894 A1* | 12/2015 | Bai | H04L 1/1854 370/311 |
| 2016/0183151 A1* | 6/2016 | Wu | H04W 76/15 370/332 |
| 2016/0192433 A1* | 6/2016 | Deenoo | H04W 72/046 370/329 |

OTHER PUBLICATIONS

Extended European Search Report received for corresponding European Patent Application No. 17838886.4, dated Mar. 10, 2020, 8 pages.
"New WI Proposal: Signalling Reduction to Enable Light Connection for LTE", 3GPP TSG RAN Meeting #71, RP-160540, Agenda Item: 10.1.2, Fluawei, Mar. 7-10, 2016, 7 pages.
International Search Report and Written Opinion received for corresponding Patent Cooperation Treaty Application No. PCT/IB2017/054738, dated Nov. 3, 2017, 23 pages.
Silva et al., "A Novel State Model for 5G Radio Access Networks", IEEE International Conference on Communications Workshops (ICC), May 23-27, 2016, 6 pages.
Silva, "Latest Considerations on the Overall Control Plane Design for the 5G RAN Architecture", METIS-II, Jun. 28, 2016, 16 pages.
"RRC Message Related Issues for LTE-NR Tight Interworking", 3rd Generation Partnership Project 3GPP TSG-RAN NG2 Meeting#95bis, R2-166494, Agenda item: 9.2.2.3, ITRI, Oct. 10-14, 2016, pp. 1-4.
"UE Behaviour and Signalling for Light Connection", 3GPP TSG-RAN WG2 #95bis, R2-166858, Agenda item: 8.9.2, Kyocera, Oct. 10-14, 2016, 8 pages.

* cited by examiner

LONG TERM EVOLUTION (LTE) LIGHT CONNECTION ENHANCEMENTS FOR LONG TERM EVOLUTION (LTE)-NEW RADIO ACCESS TECHNOLOGY (NR) INTERWORKING

RELATED APPLICATION

This application was originally filed as Patent Cooperation Treaty Application No. PCT/IB2017/054738 filed Aug. 2, 2017 which claims priority benefit to IN Patent Application No. 201641027725, filed Aug. 12, 2016.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to solutions for allowing LTE/NR tight interworking in the presence of LTE light connection.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rd-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency.

SUMMARY

One embodiment is directed to a method that includes detecting, by a user equipment in connected mode and having dual connectivity with a master node and a secondary node established, of inactivity for the master node. Based on the detection of the inactivity of the master node, the method may include entering into a power saving state. A signaling radio bearer (SRB) of the secondary node is pre-configured prior to the entering into the power saving state. The method may further include, at the time of entering the power saving state, signaling to the secondary node that the user equipment is entering into the power saving state and activating the signaling radio bearer (SRB) of the NR node.

Another embodiment is directed to an apparatus that includes at least one processor and at least one memory including computer program code. The apparatus is in connected mode and has dual connectivity with a master node and a secondary node established. The at least one memory and computer program code are configured, with the at least one processor, to cause the apparatus at least to detect inactivity of the master node, and, based on the detection of the inactivity of the master node, enter into a power saving state. A signaling radio bearer (SRB) of the secondary node is pre-configured prior to the entering into the power saving state. At the time of entering the power saving state, the at least one memory and computer program code are further configured, with the at least one processor, to cause the apparatus at least to signal to the secondary node that the apparatus is entering into the power saving state and activate the signaling radio bearer (SRB) of the secondary node.

Another embodiment is directed to an apparatus that includes a detecting unit or means for detecting of inactivity for a master node. The apparatus is in connected mode and has dual connectivity with the master node and a secondary node established. Based on the detection of the inactivity of the master node, the apparatus may further include a processing unit or means for causing the apparatus to enter into a power saving state. A signaling radio bearer (SRB) of the secondary node is pre-configured prior to the entering into the power saving state. At the time of entering the power saving state, the apparatus may include a transmitting unit or means for signaling to the secondary node that the user equipment is entering into the power saving state and an activating unit or means for activating the signaling radio bearer (SRB) of the NR node.

Another embodiment is directed to a method including configuring, by a network node, a signaling radio bearer (SRB) for a secondary node, and signaling to a user equipment, via a radio resource control (RRC) message, to switch from a connected state to a power saving state. The user equipment has dual connectivity with the network node and the secondary node established, the RRC message comprises an indication of a configuration of the signaling radio bearer (SRB) for the secondary node, and the RRC message causes the user equipment to send other RRC messages to the secondary node via the configured signaling radio bearer (SRB).

Another embodiment is directed to an apparatus that includes at least one processor and at least one memory including computer program code. The at least one memory and computer program code are configured, with the at least one processor, to cause the apparatus at least to configure a signaling radio bearer (SRB) for a secondary node, and to signal to a user equipment, via a radio resource control (RRC) message, to switch from a connected state to a power saving state. The user equipment has dual connectivity with the apparatus and the secondary node established, the RRC message comprises a configuration of the signaling radio bearer (SRB), and the RRC message causes the user equipment to send other RRC messages to the secondary node via the configured signaling radio bearer (SRB).

Another embodiment is directed to an apparatus including configuring means for configuring a signaling radio bearer (SRB) for a secondary node, and signaling means for signaling to a user equipment, via a radio resource control (RRC) message, to switch from a connected state to a power saving state. The user equipment has dual connectivity with the apparatus and the secondary node established. The RRC message comprises an indication of a configuration of the signaling radio bearer (SRB) for the secondary node, and the RRC message causes the user equipment to send other RRC messages to the secondary node via the configured signaling radio bearer (SRB).

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products supporting LTE-new radio (NR) interworking, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

In the 3GPP work item (WI), RP-160540, directed to signalling reduction to enable light connection for LTE, it was agreed to enhance LTE to reduce the radio and network interfaces signalling overhead and improve the UE access latency as well as UE power consumption for all device types. LTE-NR tight interworking is one of the important features that may be standardized as part of 3GPP Rel-14.

Dual connectivity is a LTE feature for small cell enhancement where more than one eNB may simultaneously serving a UE. In dual connectivity a given UE consumes radio resources provided by at least two different network access points, which are referred to as a master eNB (MeNB) and secondary eNBs (SeNBs), connected with non-ideal backhaul while in RRC_CONNECTED. The Master Cell Group (MCG) is the group of serving cells associated with the MeNB. The MeNB is the node that terminates at least S1-MME and therefore acts as mobility anchor towards the core network (CN). The Secondary Cell Group (SCG) is the group of serving cells associated with the SeNB. The SeNB is the eNB providing additional radio resources for the UE, which is not the Master eNB. Similar to carrier aggregation, dual connectivity aims to utilize the radio resource within multiple carriers to improve UE throughput.

For LTE-NR interworking, dual connectivity has been agreed for inter-RAT resource aggregation due to the fact that this option provides reliability of radio resource control (RRC) connection (from LTE macro cell) along with increased per user throughput small cell NR node(s). Typically, the LTE macro cell carries the control plane while the NR small cell carries the user plane.

A LTE node (e.g., UE or eNB) may enter into inactive state so that energy efficiency on the LTE connection is achieved. The inactive state in LTE uses long discontinuous reception (DRX) cycle in connected mode. 3GPP Rel-14 proposes further enhancements to have a light connection, where a UE enters into a new state (e.g., RRC-Inactive or RRC-suspended) and the security context alone is preserved in the UE and eNB without any connected mode activities. The UE is reachable via DRX based paging in these states.

It may be desirable to optimize the dual connectivity between LTE and NR in such a manner that even the control plane function may be routed via the NR node so that the LTE could be reconfigured with the light connected feature. However, when a LTE node enters into the "light connected state", there will be delay for transmission of RRC/non-access stratum (NAS) signaling messages using the LTE control plane layer. This increases the reconfiguration latency towards the UE equally for LTE and NR radio configuration changes when LTE control plane is used as the routing point.

Certain embodiments of the invention provide solutions for allowing LTE-NR tight interworking in the presence of a LTE light connection. It is noted that the LTE light connection may be considered to be similar to the CELL_PCH of the UMTS system.

An embodiment is directed to activating a signaling radio bearer (SRB) on a NR node or access point (i.e., SeNB) for a UE in RRC connected state with dual connectivity operation on LTE and NR when the UE enters into power saving states of RRC on LTE-RAT. According to one embodiment, once the UE enters the power saving state of LTE, all dedicated control channel (DCCH) messages from LTE are routed via the SeNB rather than using the LTE node (i.e., MeNB).

Some other embodiments are directed to a method that includes the pre-configuration of a signaling radio bearer (SRB) at NR-access point (i.e., SeNB) depending on the need for low latency communication without activation. In addition, certain embodiments provide an approach for activating the pre-configured SRB on the NR-SeNB for a UE in RRC-connected state with dual connectivity operation on LTE and NR when the UE enters into power saving states of RRC on LTE-RAT. In an embodiment, the change to the power saving state(s) is communicated as in-band signaling through ongoing data transfer or via physical uplink control channel (PUCCH) of NR-SeNB.

Another embodiment is directed to a method for the NR-SeNB to request for signaling message forwarding upon detecting a UE entering into a power saving state at the MeNB (i.e., LTE-eNB). In an embodiment, the MeNB may be configured to release the SRB at NR-SeNB when the RRC operation is resumed at the MeNB or upon detection of failure on NR connected mode operation or release of NR configuration (i.e., dual connectivity termination for example due to SeNB mobility). According to one embodiment, the MeNB may choose to activate SRB on NR-SeNB depending on the power saving state of both nodes and the quality of service (QoS) of currently active bearers.

In one embodiment, a UE is in RRC connected state and dual connectivity with LTE and NR is established. When conditions are satisfied which prompt the MeNB to configure the LTE into power-saving state, the MeNB may configure signaling radio bearer (SRB) at NR-SeNB via X2 signaling. According to an embodiment, the MeNB may then inform the UE to switch to the new Power-saving state but retain the RRC connection via a new RRC message. As part of this RRC message, the MeNB also includes the SCG signaling bearer configuration which can be used to carry the RRC message from this moment onwards. Further downlink and uplink, RRC messages may be sent to NR-SeNB via the newly established SRB. In uplink, NR-SeNB may forward the message to MeNB. In downlink, RRC messages constructed at MeNB may be passed to the UE via SeNB-SRB. According to one embodiment, on detection of SCG Radiolink failure, the UE sends a RRC-Resume-Request via random access channel (RACH) to MeNB. On successful resumption, the MeNB and UE start using MeNB-SRB and release the SeNB-SRB bearer.

According to an embodiment, once the UE enters the power saving state of LTE, all dedicated control channel (DCCH) messages from LTE are routed via the SeNB rather than using the LTE node (i.e., MeNB). Also, when the UE enters into power saving state in both LTE and NR nodes, depending on where the SRB is activated, the paging for reactivation can be triggered from either the LTE node or NR node. The UE monitoring for PDCCH during inactivate state may also be decided by the last activated SRB.

According to another embodiment, a UE is again in RRC connected state and dual connectivity with LTE and NR is established. If any of the evolved radio access bearers (ERABs) established have QoS that corresponds to low latency, the MeNB may also configure the SRB bearer in SeNB without activation. In this embodiment, the SeNB may store the SRB bearer configuration. The UE and MeNB may then enter into a power saving state, such as RRC-Inactive, RRC-Suspended or Light Connected, based on inactivity time. At the same time as it enters the power saving state, the UE may communicate the state change to the SeNB through PUCCH signaling if no data transfer is ongoing. However, if there is ongoing data transfer, a new media access control (MAC) element for the state-update may be sent to the SeNB. The UE may start using the SRB bearer of SeNB at this time. The SeNB may also communicate to the MeNB to route signaling message(s) upon receiving the state change update from the UE.

According to certain embodiments, MeNB mobility, NR mobility, and Radio link failure handling after the SRB activation in SCG can be further enhanced. In addition, it should be noted that the embodiments provided herein for SRB can be extended to any ERAB which was activated in MeNB that can also be preconfigured in SeNB where faster data transfer is required during power saving state.

Figure 1:
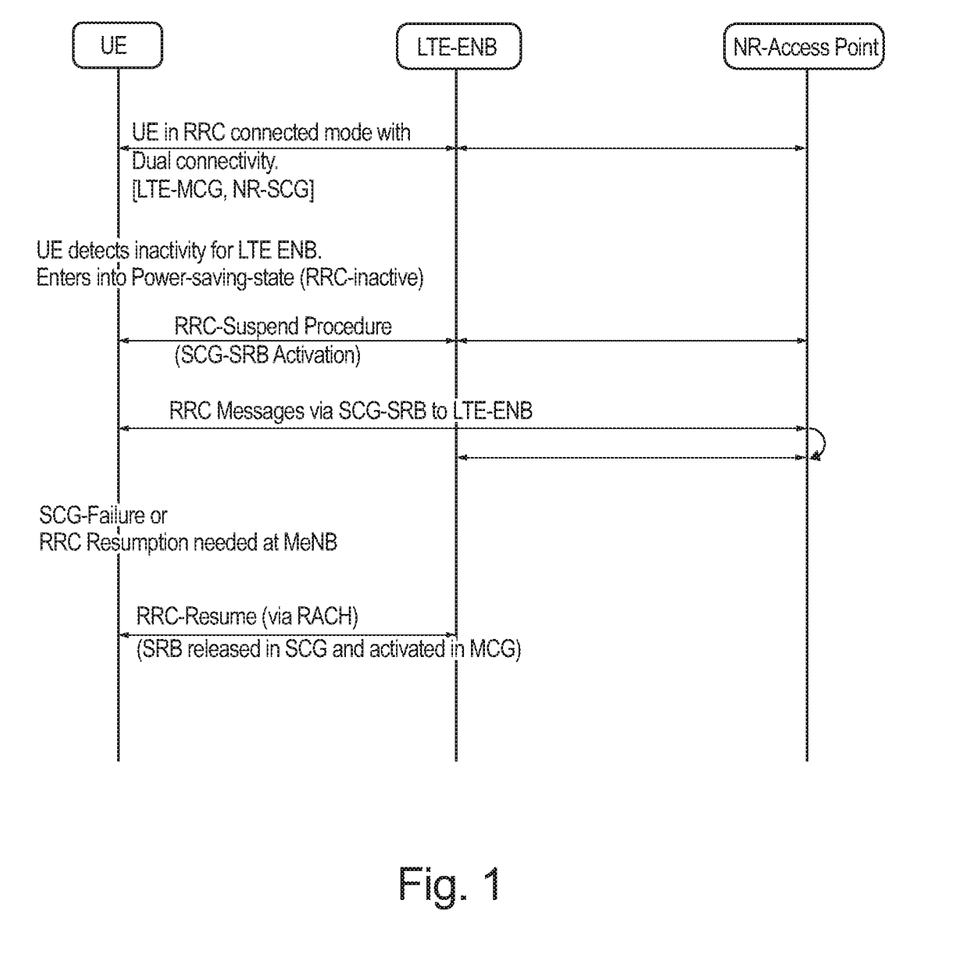
FIG. 1 illustrate an example signaling diagram, according to one embodiment of the invention.

FIG. 1 illustrates an example signaling diagram depicting one embodiment of the invention. In particular, FIG. 1 illustrates one example of signaling between a UE, a LTE node (LTE-eNB or MeNB), and a NR secondary node (NR-access point or SeNB). As depicted in FIG. 1, at 100, the UE is in RRC connected mode and dual connectivity is established with LTE-MCG and NR-SCG. At 110, the UE may detect inactivity for the LTE node and, based on this detection, the UE enters into a power saving state (e.g., RRC inactive, RRC suspended, or LTE light connected). At 120, a RRC suspension procedure may be performed, which includes the activation of SRB for SCG. Accordingly, in this embodiment, SRB on NR node (i.e., SeNB) is configured and activated at the time of entering into the power saving state. According to one embodiment, the UE may, at the time of entering the power saving state, inform the NR node via ongoing data flow or PUCCH. In another embodiment, if the UE and LTE node enter into power saving states based on internal timers, then the SRB may be pre-configured at the outset.

Continuing with the example of FIG. 1, at 130, the UE may transmit RRC messages via the SRB for SCG to the LTE node. At 140, the UE may detect failure of the SCG or detect that RRC resumption is required at the LTE node. The UE may then transmit, at 150, a RRC resume message to the LTE node, release the SRB for SCG and activate SRB for MCG.

Figure 2A:
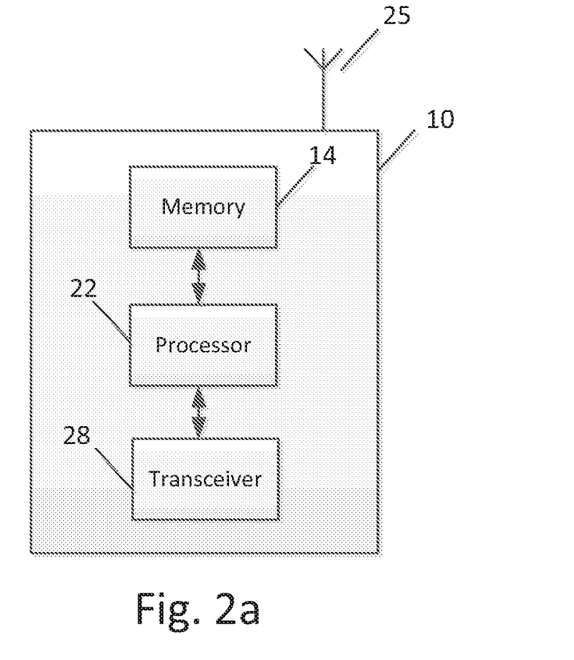
FIG. 2a illustrates an example block diagram of an apparatus, according to one embodiment.

FIG. 2a illustrates an example of an apparatus 10 according to an embodiment. In an embodiment, apparatus 10 may be a node, host, or server in a communications network or serving such a network. For example, apparatus 10 may be a network node or access node for a radio access network, such as a base station, node B or eNB, or an access node of 5G or NR radio access technology. Thus, in certain embodiments, apparatus 10 may include a base station, access node, node B or eNB serving a cell. For instance, in some embodiments, apparatus 10 may correspond to the LTE-eNB and/or NR access node illustrated in FIG. 1. It should be noted that one of ordinary skill in the art would understand that apparatus 10 may include components or features not shown in FIG. 2a.

As illustrated in FIG. 2a, apparatus 10 may include a processor 22 for processing information and executing instructions or operations. Processor 22 may be any type of general or specific purpose processor. While a single processor 22 is shown in FIG. 2a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of LTE, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station, node B or eNB, or an access node of 5G or NR, for example. In some embodiments, apparatus 10 may be an LTE eNB acting as a master eNB (MeNB) for a dual connectivity UE. According to one embodiment, apparatus 10 may be controlled by memory 14 and processor 22 to perform the functions associated with embodiments described herein. For instance, in an embodiment, apparatus 10 may be controlled by memory 14 and processor 22 to configure a SRB for a NR node, for example a NR-SeNB. In one embodiment, apparatus 10 may be controlled by memory 14 and processor 22 to configure the SRB at NR-SeNB via X2 signaling. According to certain embodiments, apparatus 10 may be controlled by memory 14 and processor 22 to configure the SRB of the NR node by activating the SRB on the NR node depending on power saving state of the apparatus 10 and the power saving state of the NR node and depending on the quality of service (QoS) of currently active bearers.

In one embodiment, apparatus 10 may then be controlled by memory 14 and processor 22 to signal to a UE, via a radio resource control (RRC) message, to switch from a (RRC) connected state to a power saving state. The power saving state may be a radio resource control (RRC) inactive state, a radio resource control (RRC) suspended state, and/or a light connected mode. According to certain embodiments, the UE has dual connectivity with long term evolution (LTE) and new radio (NR) systems established, and the RRC message comprises an indication of the configuration of the SRB for the NR-SeNB. In an embodiment, the receipt of the RRC message causes the user equipment to send RRC messages to the NR node via the configured SRB.

In some embodiments, apparatus 10 may be controlled by memory 14 and processor 22 to receive a resume request message upon failure of the NR node. Additionally, in an embodiment, when failure of the NR node is detected, apparatus 10 may be controlled by memory 14 and processor 22 to release the signaling radio bearer (SRB) of the NR node and to begin use of a SRB of the apparatus 10.

Figure 2B:
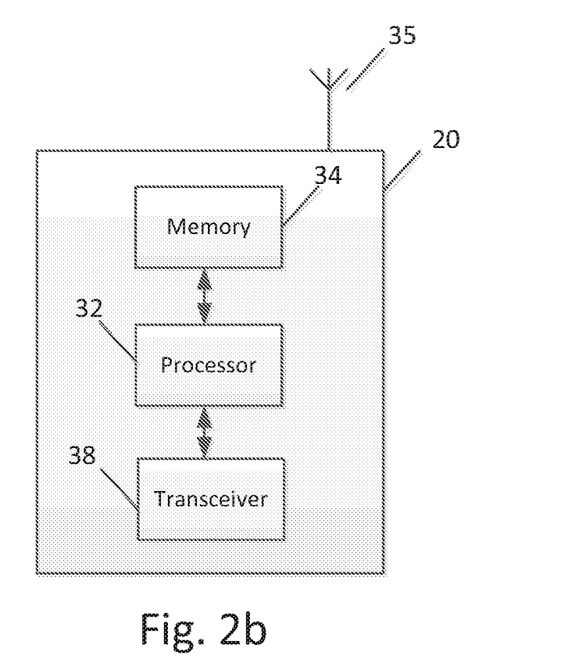
FIG. 2b illustrates an example block diagram of an apparatus, according to another embodiment.

FIG. 2b illustrates an example of an apparatus 20 according to another embodiment. In an embodiment, apparatus 20 may be a node or element in a communications network or associated with such a network, such as a UE, mobile device, stationary device, or other device. A UE may alternatively be referred to as, for example, a mobile station, mobile unit, mobile device, user device, subscriber station, wireless terminal, tablet, smart phone, or the like. Apparatus 20 may be implemented as, for example, a wireless handheld device, a wireless plug-in accessory, or the like. In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be a UE configured to operate using one or more radio access technologies, such as LTE, LTE-A, 5G, WLAN, WiFi, Bluetooth, NFC, and any other radio access technologies. Moreover, apparatus 20 may be configured to have established connections to access points using a plurality of the radio access technologies. It should be noted that one of ordinary skill in the art would understand that apparatus 20 may include components or features not shown in FIG. 2b.

As illustrated in FIG. 2b, apparatus 20 may include a processor 32 for processing information and executing instructions or operations. Processor 32 may be any type of general or specific purpose processor. While a single processor 32 is shown in FIG. 2b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for receiving a downlink or signal and for transmitting via an uplink from apparatus 20. Apparatus 20 may further include a transceiver 38 configured to transmit and receive information. The transceiver 38 may also include a radio interface (e.g., a modem) coupled to the antenna 35. The radio interface may correspond to a plurality of radio access technologies including one or more of LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly. Apparatus 20 may further include a user interface.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a mobile station or UE, for example. More specifically, according to certain embodiments, apparatus 20 may initially be a UE that is in RRC connected mode and has dual connectivity with LTE and NR established. In this embodiment, apparatus 20 may be controlled by memory 34 and processor 32 to perform the functions associated with embodiments described herein. In one embodiment, apparatus 20 may be controlled by memory 34 and processor 32 to detect inactivity of a LTE node, such as a LTE eNB or MeNB. In an embodiment, the LTE node, at the time of establishing the dual connectivity, pre-configures a SRB on a NR node. For instance, the LTE node may decide to pre-configure the SRB if there exists at least one bearer that requires low latency transmission.

Based on the detection of the inactivity of the LTE node, apparatus 20 may be controlled by memory 34 and processor 32 to enter into a power saving state and, at the time of entering the power saving state, to signal to a NR node (e.g., NR-SeNB) that the apparatus is entering into the power saving state and activate a SRB of the NR node. According to an embodiment, the SRB of the NR node may be pre-configured prior to the UE entering into the power saving state. In one embodiment, apparatus 20 may be controlled by memory 34 and processor 32 to signal the state change (from connected to power saving state) to the NR node via an ongoing data flow or via a physical uplink control channel (PUCCH). The power saving state may be a RRC inactive state, a RRC suspended state, and/or light connected mode.

According to an embodiment, apparatus 20 may then be controlled by memory 34 and processor 32 to transmit RRC messages via the activated SRB of the NR node to the LTE node. In one embodiment, when a failure of the NR node is detected or RRC resumption is required at the LTE node, apparatus 20 may be controlled by memory 34 and processor 32 to release the SRB of the NR node and activate a SRB on the LTE node. It is noted that, in certain embodiments, the LTE node may be a master eNB (MeNB) and the NR node may be a secondary eNB (SeNB).

Figure 3A:
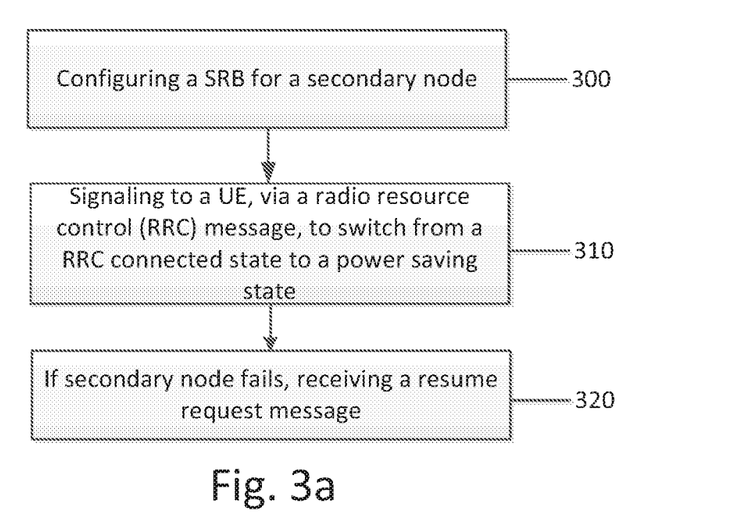
FIG. 3a illustrates an example flow diagram of a method, according to an embodiment.

FIG. 3a illustrates an example flow diagram of a method, according to one embodiment. The method may be performed by a base station, eNB, or access node, for example. More specifically, in some embodiments, the method of FIG. 3a may be executed by a LTE eNB acting as a master eNB (MeNB). The method of FIG. 3a may include, at 300, configuring or pre-configuring a SRB for a secondary or NR node, such as a NR-SeNB. In one embodiment, the configuring may include configuring the SRB for the secondary or NR node via X2 signaling. According to certain embodiments, the method may include activating the (pre-)configured SRB on the secondary or NR node depending on power saving state of the master eNB and the power saving state of the secondary or NR node and depending on the quality of service (QoS) of currently active bearers.

In one embodiment, the method may further include, at 310, signaling to a UE, via a radio resource control (RRC) message, to switch from a RRC connected state to a power saving state. The power saving state may be a radio resource control (RRC) inactive state, a radio resource control (RRC) suspended state, and/or a light connected mode. According to certain embodiments, the UE has dual connectivity with the master eNB (e.g., long term evolution (LTE) network eNB) and secondary or NR node (e.g., new radio access network node) established, and the RRC message may further include an indication of the configuration of the SRB for the secondary or NR node (e.g., NR-SeNB). In an embodiment, the receipt of the RRC message causes the UE to send further RRC messages to the secondary or NR node via the configured SRB.

In some embodiments, the method may further include, at 320, receiving a resume request message upon failure of the secondary or NR node. Additionally, in an embodiment, when failure of the secondary or NR node is detected, the method may also include releasing the signaling radio bearer (SRB) of the secondary or NR node and initiating use of a SRB of the LTE eNB.

Figure 3B:
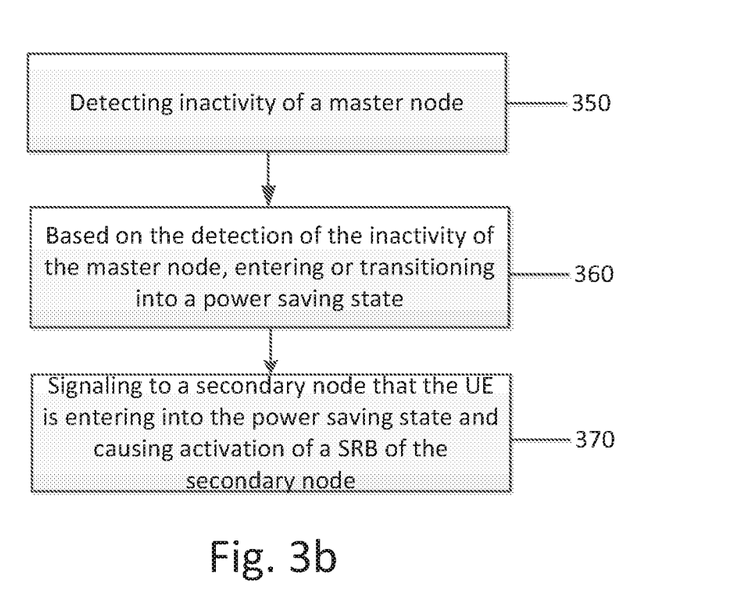
FIG. 3b illustrates an example flow diagram of a method, according to another embodiment.

FIG. 3b illustrates an example flow diagram of a method, according to one embodiment. The method may be performed by a UE or mobile station, for example. More specifically, certain embodiments of FIG. 3b may be performed by a UE that is in RRC connected mode and has dual connectivity with a master node (e.g., a LTE eNB) and a secondary node (e.g., a NR node) established. The method of FIG. 3b may include, at 350, detecting inactivity of the master node, such as a LTE eNB or MeNB. In an embodiment, the master node, at the time of establishing the dual connectivity, pre-configures a SRB on the secondary node. For instance, the master node may decide to pre-configure the SRB if there exists at least one bearer that requires low latency transmission.

Based on the detection of the inactivity of the master node, the method may include, at 360, the UE entering or transitioning into a power saving state. In one embodiment, the SRB of the secondary node may be pre-configured prior to the UE entering into the power saving state. At the time of entering the power saving state, the method may also include, at 370, signaling to the secondary node (e.g., NR-SeNB) that the UE is entering into the power saving state and causing activation of the pre-configured SRB of the secondary node. In one embodiment, the signaling of the state change may include signaling the state change (from connected to power saving state) to the secondary node via an ongoing data flow or via a physical uplink control channel (PUCCH). The power saving state may be a RRC inactive state, a RRC suspended state, and/or light connected mode, for example.

In certain embodiments, the method may also include transmitting RRC messages via the activated SRB of the secondary node to the master node. In one embodiment, when a failure of the secondary node is detected or RRC resumption is required at the master node, the method may include releasing the SRB of the secondary node and activating a SRB on the master node. It is noted that, in certain embodiments, the master node may be a LTE master eNB (MeNB) and the secondary node may be a NR node or LTE secondary eNB (SeNB), for example.

Embodiments of the invention provide several advantages and/or technical improvements. For example, embodiments of the invention can improve performance and throughput of network nodes including, for example, eNBs and UEs. In particular, according to embodiments, the LTE light connection benefits are maintained for LTE-NR interworking scenarios also with the activation of SRB at NR node on entering into power saving states. Also, the delay for downlink SRB transmission due to LTE light connection is avoided with the presence of SRB via SeNB. As a result, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor. In some embodiments, the apparatus may be, included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
   at least one processor; and
   at least one memory including computer program code,
   wherein the at least one memory and computer program code are configured, with the at least one processor, to cause the apparatus at least to
   detect inactivity of a master node;
   based on the detection of the inactivity of the master node, enter into a power saving state, wherein a signaling radio bearer (SRB) of a secondary node is pre-configured without activation prior to the entering into the power saving state; and
   at time of entering into the power saving state, signal to the secondary node that the apparatus is entering into the power saving state and activate the signaling radio bearer (SRB) of the secondary node, wherein
   the apparatus is in connected mode and has dual connectivity with the master node and the secondary node established.

2. The apparatus according to claim 1, wherein the signaling radio bearer (SRB) of the secondary node is pre-configured by the master node, at the time of establishing the dual connectivity.

3. The apparatus according to claim 1, wherein the signaling radio bearer (SRB) pre-configuration is decided by the master node if there exists at least one bearer which requires low latency transmission.

4. The apparatus according to claim 1, wherein the at least one memory and computer program code are further configured, with the at least one processor, to cause the apparatus at least to signal the state change to the secondary node via ongoing data flow or via physical uplink control channel (PUCCH).

5. The apparatus according to claim 1, wherein the at least one memory and computer program code are further configured, with the at least one processor, to cause the apparatus at least to transmit radio resource control (RRC) messages via the signaling radio bearer (SRB) of the secondary node to the master node.

6. The apparatus according to claim 1, wherein, when a failure of the secondary node is detected or radio resource control (RRC) resumption is required at the master node, the at least one memory and computer program code are further configured, with the at least one processor, to cause the apparatus at least to release the signaling radio bearer (SRB) of the secondary node and activate signaling radio bearer (SRB) on the master node.

7. The apparatus according to claim 1, wherein the power saving state comprises at least one of: radio resource control (RRC) inactive, radio resource control (RRC) suspended, or light connected mode.

8. The apparatus according to claim 1, wherein the master node is a long term evolution (LTE) eNB, and wherein the secondary node is a new radio access technology (NR) node or a LTE eNB.

9. The apparatus according to claim 1, wherein the apparatus comprises a user equipment (UE).

10. A method, comprising:
    detecting, by a user equipment in connected mode and having dual connectivity with a master node and a secondary node established, of inactivity for the master node;
    based on the detection of the inactivity of the master node, entering into a power saving state, wherein a signaling radio bearer (SRB) of the secondary node is pre-configured without activation prior to the entering into the power saving state; and
    at time of entering into the power saving state, signaling to the secondary node that the user equipment is entering into the power saving state and activating the signaling radio bearer (SRB) of the secondary node.

11. The method according to claim 10, wherein the signaling radio bearer (SRB) of the secondary node is pre-configured by the master node, at the time of establishing the dual connectivity.

12. The method according to claim 10, wherein the signaling radio bearer (SRB) pre-configuration is decided by the master node if there exists at least one bearer which requires low latency transmission.

13. The method according to claim 10, wherein the signaling comprises signaling to the secondary node via ongoing data flow or physical uplink control channel (PUCCH).

14. The method according to claim 10, further comprising transmitting radio resource control (RRC) messages via the signaling radio bearer (SRB) of the secondary node to the master node.

15. An apparatus, comprising:
    at least one processor; and
    at least one memory including computer program code,
    wherein the at least one memory and computer program code are configured, with the at least one processor, to cause the apparatus at least to
    configure a signaling radio bearer (SRB) for a secondary node without activating the SRB; and
    signal to the user equipment, via a radio resource control (RRC) message, to switch from a connected state to the power saving state,
    wherein the user equipment has dual connectivity with the apparatus and secondary node established,
    wherein the RRC message comprises a configuration of the signaling radio bearer (SRB), and
    wherein the RRC message causes the user equipment to activate the SRB and send other RRC messages to the secondary node via the configured signaling radio bearer (SRB).

16. The apparatus according to claim 15, wherein the at least one memory and computer program code are further configured, with the at least one processor, to cause the apparatus at least to receive a resume request message upon failure of the secondary node.

17. The apparatus according to claim 15, wherein, when failure of the secondary node is detected, the at least one memory and computer program code are further configured, with the at least one processor, to cause the apparatus at least to release the signaling radio bearer (SRB) of the secondary node and use a signaling radio bearer (SRB) of the apparatus.

18. The apparatus according to claim 15, wherein the at least one memory and computer program code are further configured, with the at least one processor, to cause the apparatus at least to configure the signaling radio bearer (SRB) by activating the signaling radio bearer (SRB) on the secondary node depending on power saving state of the apparatus and the secondary node and depending on quality of service (QoS) of currently active bearers.

19. The apparatus according to claim 15, wherein the apparatus comprises a master evolved node B (MeNB), and wherein the secondary node comprises a new radio access technology (NR) node or a secondary evolved node B (SeNB).

20. The apparatus according to claim 15, wherein the power saving state comprises at least one of: radio resource control (RRC) inactive, radio resource control (RRC) suspended, or light connected mode.

* * * * *